US011435589B2

United States Patent
Lou et al.

(10) Patent No.: US 11,435,589 B2
(45) Date of Patent: *Sep. 6, 2022

(54) WAVEGUIDE DISPLAY DEVICE

(71) Applicant: Shanghai North Ocean Photonics Co., Ltd., Shanghai (CN)

(72) Inventors: Xinye Lou, Shanghai (CN); He Huang, Shanghai (CN); Tao Lin, Shanghai (CN)

(73) Assignee: Shanghai North Ocean Photonics Co., Ltd., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/152,737

(22) Filed: Jan. 19, 2021

(65) Prior Publication Data

US 2021/0157148 A1 May 27, 2021

Related U.S. Application Data

(62) Division of application No. 16/695,141, filed on Nov. 25, 2019, now Pat. No. 10,962,787.

(51) Int. Cl.
*G02B 27/01* (2006.01)
*F21V 8/00* (2006.01)
*G02B 27/00* (2006.01)

(52) U.S. Cl.
CPC ....... *G02B 27/0172* (2013.01); *G02B 6/0016* (2013.01); *G02B 6/0036* (2013.01); *G02B 27/0081* (2013.01); *G02B 2027/0118* (2013.01); *G02B 2027/0138* (2013.01); *G02B 2027/0178* (2013.01)

(58) Field of Classification Search
CPC .................. G02B 6/34; G02B 27/0172; G02B 2027/0178
See application file for complete search history.

(56) References Cited

U.S. PATENT DOCUMENTS

| | | | |
|---|---|---|---|
| 8,405,573 B2 * | 3/2013 | Lapidot | G02B 27/017 345/8 |
| 10,095,045 B2 * | 10/2018 | Robbins | G02B 5/1833 |
| 10,317,677 B2 * | 6/2019 | Levola | G02B 27/0081 |
| 10,935,730 B1 * | 3/2021 | Lou | G02B 27/0172 |
| 10,962,787 B1 * | 3/2021 | Lou | G02B 6/0036 |

* cited by examiner

*Primary Examiner* — Daniel Petkovsek
(74) *Attorney, Agent, or Firm* — Raymond Y. Chan; David and Raymond Patent Firm

(57) ABSTRACT

An optical waveguide includes an input diffractive optical element arranged for being aligned with an optical projector for diffracting the light beam therefrom, a waveguide substrate arranged for reflecting the light beam diffracted by the input diffractive optical element by means of total internal reflection, and an output diffractive optical element coupled at said waveguide substrate for partially diffracting the light beam as a diffracted light and partially transmitting the light beam as a transmitted light during the total internal reflection of the light beam within the waveguide substrate. The diffracted light is diffracted by the output diffractive optical element and is projected out of the waveguide substrate toward the user eye. The transmitted light is continuously transmitted and reflected within the waveguide substrate by the total internal reflection until the transmitted light is totally diffracted out of the waveguide substrate, so as to complete an exit pupil expansion.

15 Claims, 13 Drawing Sheets

| | |
|---|---|
| n | 1.7 |
| λ | 525nm |
| Λ | 370nm |
| w | 185nm |
| ff | 0.5 |
| α | 45° |

Fig. 14

| N | $h_N$ (nm) |
|---|---|
| 1 | 37 |
| 2 | 39 |
| 3 | 41 |
| 4 | 43 |
| 5 | 46 |
| 6 | 50 |
| 7 | 58 |
| 8 | 70 |
| 9 | 95 |
| 10 | 134 |
| 11 | 199 |
| 12 | 290 |

Fig. 15

| | |
|---|---|
| n | 1.7 |
| λ | 525nm |
| $Λ_1$ | 577.5nm |
| $Λ_2$ | 577.5nm |
| h | 525nm |
| θ | 30° |
| φ | 30° |

Fig. 16

| N | d (mm) | ff$_N$ |
|---|---|---|
| 1 | 127.05 | 0.220 |
| 2 | 129.36 | 0.224 |
| 3 | 132.83 | 0.230 |
| 4 | 136.29 | 0.236 |
| 5 | 139.76 | 0.242 |
| 6 | 144.38 | 0.250 |
| 7 | 149.00 | 0.258 |
| 8 | 155.93 | 0.270 |
| 9 | 165.17 | 0.286 |
| 10 | 175.56 | 0.304 |
| 11 | 192.89 | 0.334 |
| 12 | 232.16 | 0.402 |

Fig. 17

WAVEGUIDE DISPLAY DEVICE

CROSS REFERENCE OF RELATED APPLICATION

This is a Divisional Application that claims the benefit of priority under 35U.S.C.§ 120, U.S. patent application Ser. No. 16/695,141, filed Nov. 25, 2019, now U.S. Pat. No. 10,692,787, which is incorporated herewith by reference in its entirety.

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to an augmented reality display device (AR) or a head-up display device, and more particularly to a waveguide display device, which is able to increase a brightness uniformity of a pupil output image and to improve a system output efficiency.

DESCRIPTION OF RELATED ARTS

Augmented reality is a new technology to provide an interactive experience of a real world environment where virtual objects are resided in the real world in a real time manner. Accordingly, a computer-generated prompt message, virtual object, or virtual scene is superimposed into the real world to achieve the interactive experience for the users. Applications of augmented reality can be widely used in data model visualization, military weapon development and manufacturing, flight navigation, medical training, remote control, entertainment and art, in order to enhance display output in real-world environments.

There are two major types of display devices in augmented reality technology, which are an optical transmission type and a video transmission type. Optical transmission augmented reality display systems have become mainstream due to their high resolution, no visual bias, no delay, and better social habits.

In order to configure an optical transmission augmented reality display, a conventional optical system based on a Bird Bath or a free-form surface element has been designed for forming the superposition of virtual and real worlds with refraction and reflection. However, since the display system is constructed by conventional optical components, it is limited by the overall optical distance to minimize a thinness of the display system. The wear-ability of the display system as a spectacle cannot be achieved. Furthermore, due to the constraints of the Lagrangian invariant, the size of the conventional optical display system is limited, and the optical display system cannot perfectly match with the pupils of the user. The waveguide display device can effectively solve the above two problems comparing to the conventional optical systems. After a single color or RGB image is inserted into the waveguide, the total internal reflection of the light in the planar waveguide element is utilized, to effectively reduce the thickness of the optical component. By using one or more optical components on the waveguide to control the image sequencing output, an exit pupil expansion is achieved. Based on the exit pupil expansion in the waveguide display device, the light energy in the waveguide is gradually attenuated during the image sequencing output process, and the diffraction efficiency of the input-and-output optical components on the diffraction waveguide is low, such that the system energy is significantly lost. Therefore, how to achieve a uniform image brightness and improve system transmission efficiency are major concerns to improve the user experience and system performance of augmented reality displays or heads-up displays.

Accordingly, Chinese patent, CN104280885A entitled "large exit pupil holographic waveguide glass system" disclosed a method of interfering light intensity conversion phase, wherein it can only be used for refractive index modulated holographic grating waveguides. Chinese patent, CN107690599A entitled "Optical Display System", and U.S. Pat. No. 9,329,325 entitled "Optical Waveguides" disclose a method of plating one or more layers of gradient film on a monolithic optical waveguide to change the diffraction efficiency. However, the gradient coating process is complicated and the manufacturing cost is relatively high since the process is performed on a single optical waveguide.

SUMMARY OF THE PRESENT INVENTION

The invention is advantageous in that it provides a waveguide display device, which is able to increase a brightness uniformity of a pupil output image, to improve a system output efficiency and to reduce the manufacturing cost.

Another advantage of the invention is to a waveguide display device, wherein the grating structure is modulated to provide a uniform brightness of the image being seen by the user, even though there is any relative displacement of the AR spectacle with respect to the user eyes, the brightness of the image will remain uniform and stable (the brightness in the window eyebox is uniform).

Additional advantages and features of the invention will become apparent from the description which follows, and may be realized by means of the instrumentalities and combinations particular point out in the appended claims.

According to the present invention, the foregoing and other objects and advantages are attained by a waveguide display device comprising a waveguide substrate, an input diffractive optical element and an output diffractive optical element.

The input diffractive optical element is arranged for coupling an output light of a light projector to the waveguide substrate.

The waveguide substrate is arranged for reflecting light from the input diffractive optical element by means of total internal reflection toward the output diffractive optical element.

The output diffractive optical element for partially diffracting and partially transmitting light reflected by the waveguide substrate via the total internal reflection, wherein at each light reflection, the diffracted light is projected out of the waveguide substrate toward a user eye, and the transmitted light is continuously reflected within the waveguide substrate by means of total internal reflection until the light is diffracted out of the waveguide substrate for completing an exit pupil expansion.

The input diffractive optical element is optimized to have high coupling diffraction efficiency for improving display system efficiency and reducing power consumption. The input diffractive optical element is selected from a flitting grating, an asymmetric surface relief grating, or other diffractive structure having high coupling efficiency.

The waveguide substrate can be a flat plate structure made of high transparent optical material for visible light passing through, wherein the upper and lower surfaces thereof are extended parallel. The input diffractive optical element and the output diffractive optical element can be closely adhered to the surface of the waveguide substrate, or can be embedded in the waveguide substrate.

The output diffractive optical element is incorporated with a periodic structure with low coupling diffraction efficiency to ensure continuous light energy output during the process of the exit pupil expansion. The coupling diffraction efficiency is modulated in an effective region of the output diffractive optical element, wherein the modulation method can be a regional modulation or continuous modulation. The regional modulation or continuous modulation is optimized according to the path of the exit pupil expansion.

For maximizing the efficiency of the waveguide display system, by improving the coupling diffraction efficiency of the input diffractive optical element, the output diffractive optical element is arranged to output all of the light energy in the waveguide substrate in its effective region when the light is totally reflected therewithin. At the same time, in order to provide a uniform brightness of an image within the range of the exit pupil of the waveguide display device, the output diffractive optical element is arranged to maintain a constant light flux output per unit area in its effective area. According to the characteristics of exit pupil expansion with sequencing energy output by the output diffractive optical element, the coupled output diffraction efficiency of the output diffractive optical element is optimized to:

$$\eta_N = \frac{1}{N_T - (N-1)} \quad (1)$$

wherein N is the output order of the regional modulation, $N_T$ is the total number of modulation regions, and $\eta_N$ is the coupling efficiency of the Nth region.

Due to the limitations of the structure or machine accuracy of the diffractive optical element, when the coupling output efficiency of the output diffractive optical element after optimization cannot be equal to the result given by the equation (1), a portion of the light energy is generated by the total internal reflection in the waveguide substrate within its effective coupling area. Assuming that the ratio of this portion of the light energy to the total light energy of total internal reflection is $\eta\tau$, in order to provide the uniform brightness of the image within the range of the exit pupil, the coupling output efficiency of the output diffractive optical element is optimized to:

$$\eta_N = \frac{\eta_T}{N_T - (N-1)} \quad (2)$$

The output diffractive optical element can be selected as a one-dimensional diffraction grating, wherein the diffraction efficiency is modulated based on the parameters of the diffraction structure. In other words, by changing the position of the waveguide surface, the one-dimensional diffraction grating structure can be optimized, to ensure the coupling output diffraction efficiency of the output diffractive optical element following the equation (1) or (2). For example, a one-dimensional straight tooth surface relief grating can modulate the duty cycle and the tooth height, a one dimensional slanted tooth surface relief grating can modulate duty cycle, tooth height and tilt angle, and a one-dimensional blazed grating can modulate tooth height and surface angle.

The output diffractive optical element can be selected as a two-dimensional periodic diffractive structure, wherein the diffraction efficiency is modulated based on the parameters of the diffraction structure. In other words, by changing the position of the waveguide surface, the two-dimensional periodic diffraction grating structure can be optimized, to optimize the coupling output diffraction efficiency of the output diffractive optical element. For example, a two-dimensional columnar diffractive structure can modulate the duty cycle and the tooth height.

The etching process of the present invention can be one of electron beam etching, reactive ion beam etching, magnetically enhanced reactive ion etching, high density plasma etching, inductively coupled plasma etching, pressure swing coupled plasma etching, and electrons cyclotron resonance etching. The modulation tooth height can be achieved by controlling the etching time and exposure intensity of the electron beam or ion beam on the master substrate. For mass production, the grating structure on the master substrate can be copied into the replica resin material by nano imprinting, casting, molding, injection molding, and the like in order to reduce the manufacturing cost.

In accordance with another aspect of the invention, the present invention comprises Still further objects and advantages will become apparent from a consideration of the ensuing description and drawings.

These and other objectives, features, and advantages of the present invention will become apparent from the following detailed description, the accompanying drawings, and the appended claims.

BRIEF DESCRIPTION OF THE DRAWINGS

FIG. 14 is a table showing the relevant parameters of the system and the grating.

FIG. 15 is a table showing the tooth profile depth of the grating in each modulation region.

FIG. 16 is a table showing the relevant parameters of the system, the diffraction structure, and the angle of incidence.

FIG. 17 is a table showing the duty cycle of the columnar structure in each modulation region.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Figure 1:
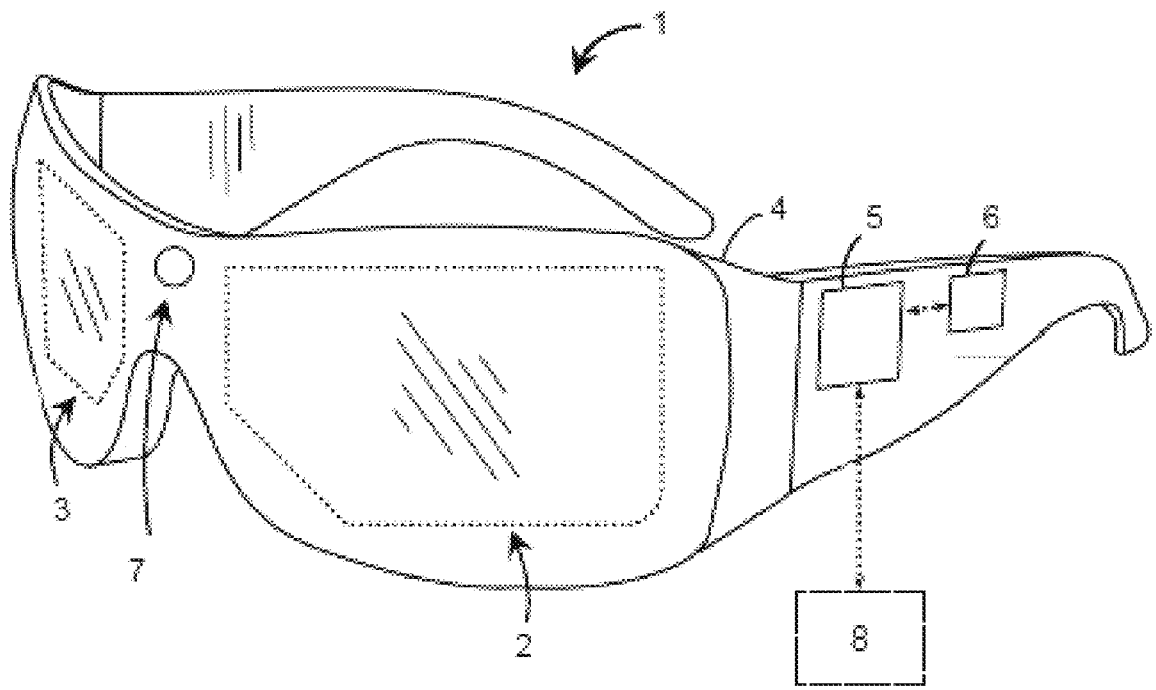
FIG. 1 is a perspective view of a spectacle frame of a waveguide display device with an optical transmission augmented reality system according to a preferred embodiment of the present invention.

Referring to FIG. 1 of the drawings, an augmented reality device for being worn by a user is illustrated, wherein the augmented reality wearable device comprises a spectacle frame 4 and a waveguide display device. The spectacle frame 4 comprises two spectacle arms and a bridge, and an augmented reality system 1, which is based on an optical waveguide. The augmented reality system 1 comprises a waveguide display device which comprises two optical waveguides, i.e. a left-eye optical waveguide 2 and a right-eye optical waveguide 3, wherein the bridge is extended between two inner sides of the optical waveguides and the spectacle arms are extended from two outer sides of the optical waveguides respectively. The augmented reality system 1 further comprises a computing module 5, a positioning sensor 6, an external space collector 7, and a remote computing system 8. The left-eye optical waveguide 2 and the right-eye optical waveguide 3 have a high light transmittance for the user to clearly see through the left-eye optical waveguide 2 and the right-eye optical waveguide 3 to view the real world. The computing module 5 is provided at, preferably built-in with, a spectacle arm for generating corresponding image signals for the left and right eyes of the user when wearing the spectacle frame 4 in order to provide a three-dimensional stereoscopic experience for the user. The computing module 5 is further operatively connected with various sensors, such as the positioning sensor 6 and the external space collector 7, in the system at the same time. The positioning sensor 6 is arranged to determine the position and orientation in a given coordinate system for the augmented reality system, wherein the positioning sensor 6 includes the degree of freedom of movement in the direction of the three orthogonal coordinate axes and the degree of freedom of rotation about the three coordinate axes. Accordingly, the positioning sensor 6 can be a combination of an accelerometer, a gyroscope, a magnetometer, and a global positioning system receiver. After the computing module 5 is operated to process an output of the position sensor 6, the virtual object is accurately rendered in the real world. The external space collector 7 is built-in at the bridge and can be a combination of a RGB camera, a monochrome camera, and a depth camera. An RGB camera or a monochrome camera is arranged to acquire a real scene of the external environment, wherein the depth camera is arranged to acquire depth information of the external environment. When the optical axes of the depth camera and other cameras are parallel and synchronized in a time manner, a complete information of the actual scene can be obtained. The remote computing system 8 is arranged to provide an additional computing power to the computing module 5 at the spectacle frame 4 by connecting the computing module 5 with the remote computing system 8 by wire or wireless connection. Alternatively, the remote computing system 8 can be the only computing means to replace the computing module 5 for data computation in the augmented reality system 1.

Figure 2:
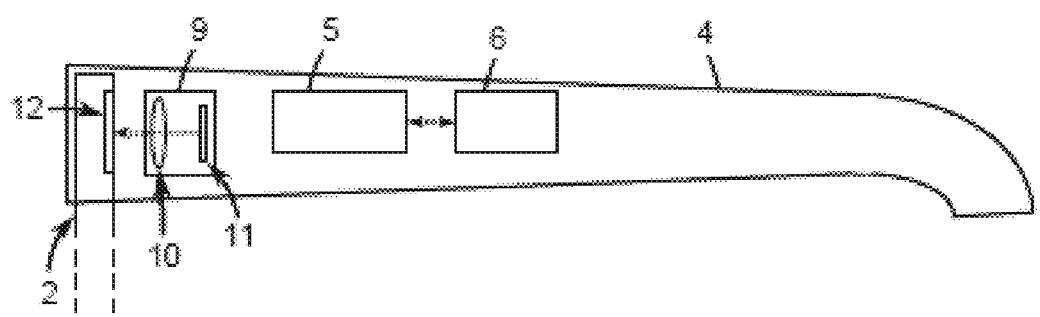
FIG. 2 is a side view of the spectacle frame of the waveguide display device with the optical transmission augmented reality system according to the above preferred embodiment of the present invention.

As shown in FIG. 2, the augmented reality system 1 further comprises an optical projector 9 built-in with at least one of the spectacle arms of the spectacle frame 4 to form a compact structure. The optical projector 9 comprises a micro-display 11 for projecting an image in form of the light beam and a lens set 10, wherein after the image is amplified by the lens set 10, the image is input to the left-eye optical waveguide 2 through an input diffractive optical element 12 coupled thereto. Accordingly, the micro-display 11 can be a liquid crystal display (LCD) with high light transmittance for forming the image via a projection modulation of liquid crystal molecules on the backlight. Alternatively, the image can be formed by reflective modulation method, such as digital light processors (DLPs) and liquid crystal on silicon (LCoS). It is worth mentioning that the micro-display 11 can also incorporate with a self-illuminating organic light emitting diode (OLED) and a micro light emitting diode (Micro LED). The micro-display 11 can also incorporate with a MEMS Scanning Mirror. The lens group 10 is constructed with one or more optical lenses for image amplification.

Figure 3:
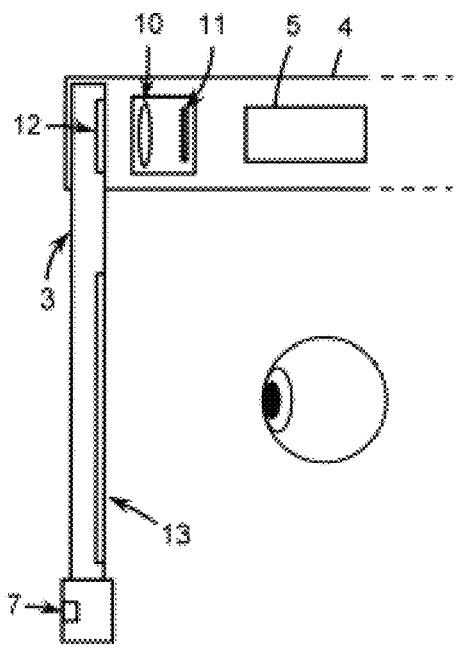
FIG. 3 is a sectional view of the waveguide display device with the optical transmission augmented reality system according to the above preferred embodiment of the present invention.

As shown in FIG. 3, the right-eye optical waveguide 3 is coupled at a right side of the spectacle frame 4, wherein the right-eye optical waveguide 3 comprises the input diffractive optical element 12 and an output diffractive optical element 13. Accordingly, after the light diffracted by the input diffractive optical element 12 is guided to input in the right-eye optical waveguide 3, the light is totally reflected and transmit to the output diffractive optical element 13 so as to project to the user eye.

Figure 4:
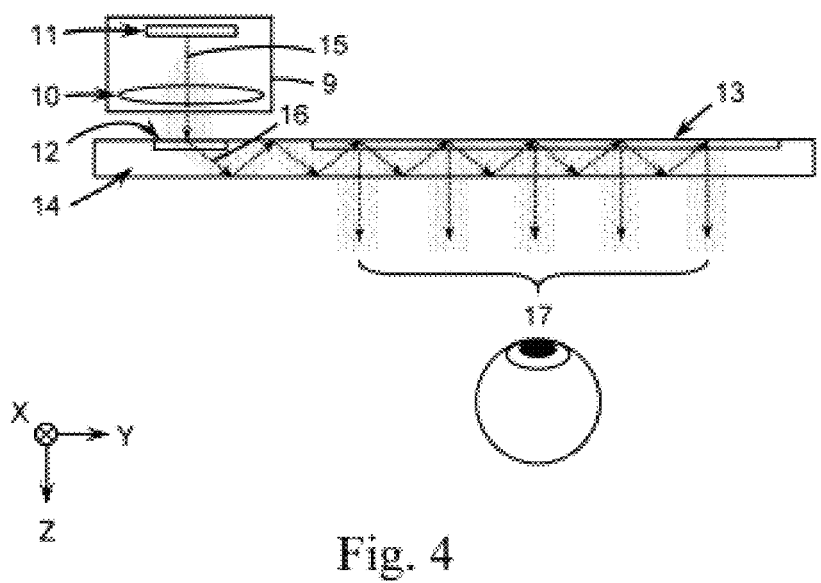
FIG. 4 is a top view of the waveguide display device with the optical transmission augmented reality system according to the above preferred embodiment of the present invention.

As shown in FIG. 4, the light beam 15 generated by the pixel of the micro-display 11 is collimated by the lens set 10 in the optical projector 9. After being diffracted by the input diffractive optical element 12, the first diffraction order light beam 16 satisfies the total internal reflection condition of the waveguide. Therefore, the first diffraction order light beam 16 is arranged to be fully reflected in a waveguide substrate 14 of the right-eye optical waveguide 3 toward the output diffractive optical element 13. At each time the first diffraction order light beam 16 contacts with the output diffractive optical element 13, the first diffraction order light beam 16 is partially transmitted and is partially diffracted. The diffracted light 17 is guided to projected out of the waveguide substrate 14 toward the user eye. The transmitted light is guided to continuously transmit in the waveguide substrate 14 in total internal reflection until the first diffraction order light beam 16 is guided to diffract of the waveguide substrate 14 toward the user eye, so as to complete the exit pupil expansion along a Y-direction.

It is worth mentioning that the waveguide substrate 14 has a diffractive side and an opposed projecting side, wherein the input diffractive optical element 12 and the output diffractive optical element 13 are located at the diffractive side of the waveguide substrate 14 for guiding the diffracted lights 17 being projected out the waveguide substrate 14 through the projecting side thereof.

Figure 5:
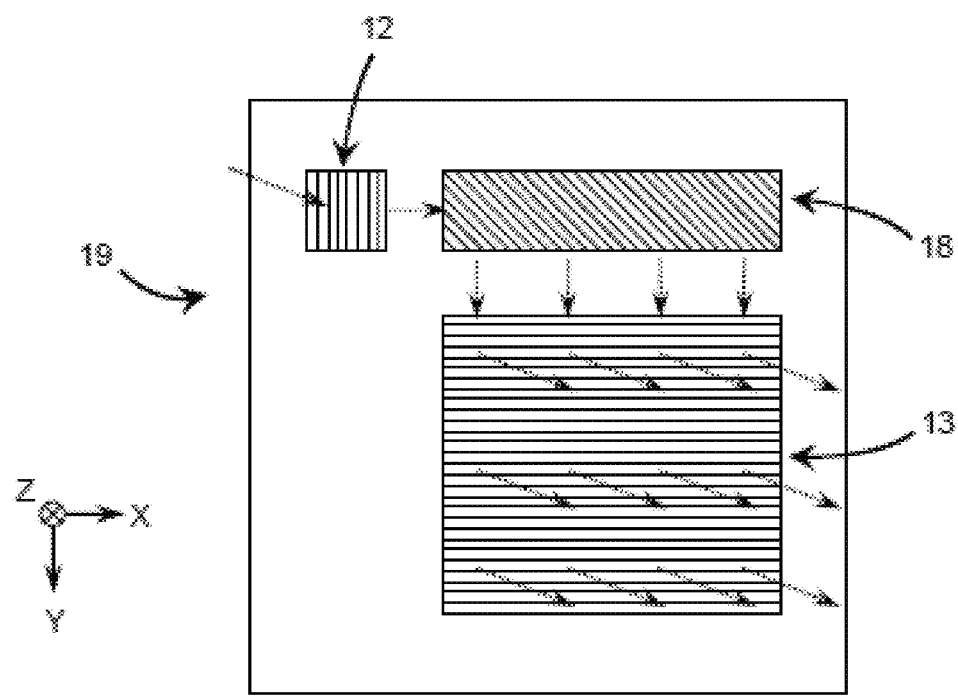
FIG. 5 illustrates a one-dimensional linear diffraction two dimensional exit pupil optical waveguide according to the above preferred embodiment of the present invention.

Accordingly, the present invention is able to apply to different configurations of the diffraction waveguide augmented reality. The augmented reality device based on a one-dimensional linear diffraction waveguide will be described as the following example. FIG. 5 illustrates a one-dimensional linear diffraction waveguide, which comprises an input diffractive optical element 12, an output diffractive optical element 13, and a transmission diffractive optical element 18. The configuration is able to perform a two-dimensional extension. The input image of the optical projector (not shown) is in the direction of propagation of the field of view centering on the plane orthogonal to the plane of the one-dimensional linear diffraction waveguide 19. The input diffractive optical element 12 is arranged to diffract the input light, wherein the first diffraction order satisfies the total internal reflection condition of the waveguide substrate, such that the light is guided toward the transmission diffractive optical element 18 in the substrate. The total reflected light in the one-dimensional linear diffraction waveguide 19 will be transmitted or diffracted each time when the light contacts with the transmission diffractive optical element 18. The transmission direction of the first diffraction order generated by the diffraction of the transmission diffractive optical element 18 is deflected to satisfy the total internal reflection condition of the waveguide substrate, such that the light is guided toward the output diffractive optical element 13 in the substrate. The light directly transmitted through the transmission diffractive optical element 18 will be continuously reflected via the total internal reflection until the light is diffracted and transmitted out of the output diffractive optical element 13 so as to complete the one-dimensional exit pupil expansion along a X-direction. Furthermore, the light from the transmission region is also partially diffracted and partially transmitted each time when the light contacts the output diffractive optical element 13. The diffracted light is projected out of the one-dimensional linear diffraction waveguide 19 toward the user eye. The transmitted light is guided to be continuously reflected via the total internal reflection in the one-dimensional linear diffraction waveguide 19 until the light is diffracted and transmitted out of the output diffractive optical element 13 so as to complete the one-dimensional exit pupil expansion along a Y-direction. The lights are successively expanded in the X and Y dimensions, such that the waveguide display device as shown in FIG. 5 can perform the two-dimensional exit pupil expansion by diffracting the light through the diffractive optical element 18 and outputting the light from the output diffractive optical element 13. The waveguide display device can be configured as shown in FIG. 5, to include only the input diffractive optical element and the output diffractive optical element, but the transmission diffractive optical element is omitted. In one example, after the input light is diffracted by the input diffractive optical element, the light is guided to directly reflect toward the output diffractive optical element for total internal reflection, such that the light is guided to gradually diffract by the output diffractive optical element so as to complete the one-dimensional expansion.

Figure 6A:
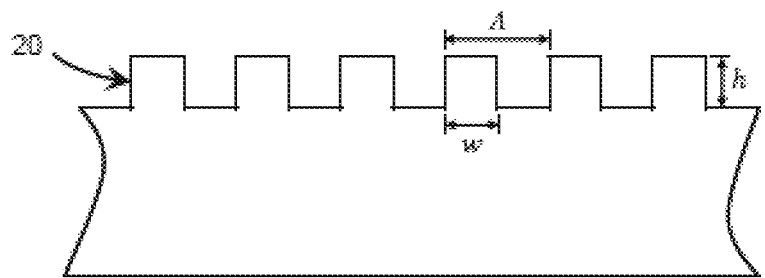
FIG. 6A illustrates a one dimensional straight tooth surface relief grating according to the above preferred embodiment of the present invention.
Figure 6B:
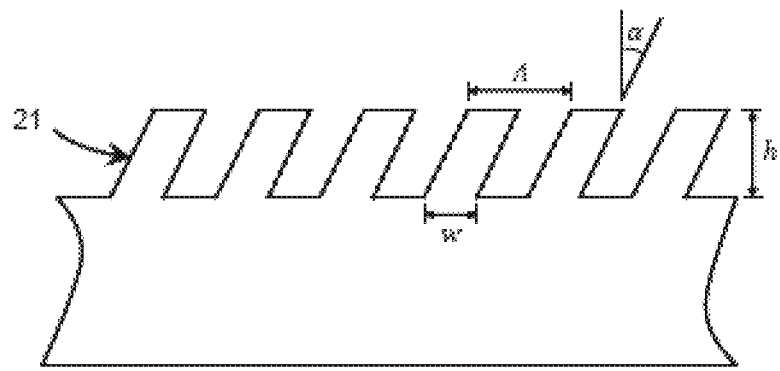
FIG. 6B illustrates a one dimensional slanted tooth surface relief grating according to the above preferred embodiment of the present invention.
Figure 6C:
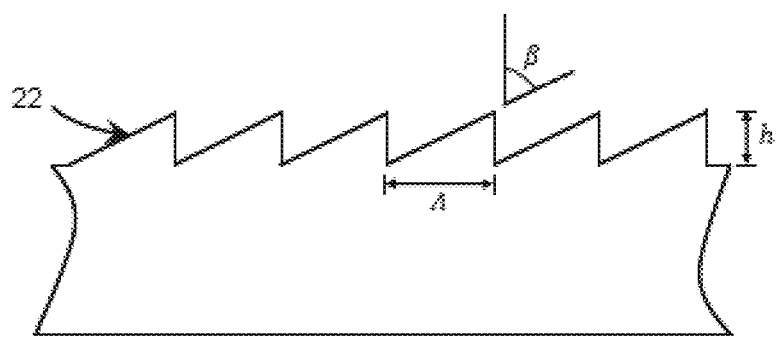
FIG. 6C illustrates a one dimensional blazed grating according to the above preferred embodiment of the present invention.

FIGS. 6A to 6C illustrate three different configurations of the one-dimensional linear diffraction grating. The input diffractive optical element 12, the output diffractive optical element 13 and the transmission diffractive optical element 18 can all be selectively constructed in the above different configurations. FIG. 6A illustrates a one dimensional straight tooth surface relief grating 20 which comprises a toothed unit perpendicularly extended to the waveguide substrate, wherein its associated tooth profile parameters can be a grating period Λ, a tooth width w and a tooth height h. FIG. 6B illustrates a one dimensional slanted tooth surface relief grating 21, wherein the toothed unit is slantedly extended to the waveguide substrate with an angle α, and its associated tooth profile parameters can be a grating period Λ, a tooth width w and a tooth height h. FIG. 6C illustrates a one dimensional blazed grating 22, wherein an angle between the blazed surface and the non-blazed surface is β, the grating period is Λ, and the tooth height is h. Accordingly, each of the grating structures shown in FIG. 6A-6C has a constant tooth profile. In other words, the parameters associated with the tooth profile do not change with respect to the position of the grating at the waveguide face, i.e., the grating structure is non-modulated. However, the diffraction efficiency of the grating is determined by parameters of the tooth shape, wherein the non-modulated grating structure has the same diffraction efficiency for the incident light in the same direction. Therefore, since the output diffractive optical element is needed to gradually output the light energy within its effective region in the waveguide substrate via the total internal reflection, the same diffraction efficiency will cause the reduction of luminous flux output at each step output. Therefore, it is impossible to obtain a uniform brightness image to the user within the exit pupil range of the waveguide.

In order to solve the above problems, the present invention provides a modulation grating structure. In other words, via the method of changing the tooth shape with the position of the grating on the waveguide surface, the diffraction efficiency of coupling output of the output diffractive optical element at different positions will be different. According to the characteristics of the energy sequencing output of the output diffractive optical element for the exit pupil expansion, when the coupling output diffraction efficiency of the output diffractive optical element is optimized to form the result given by the equation (1), the luminous flux output per unit area in the effective area is kept constant, such that the brightness of the image projected to the user is uniform and the efficiency of the waveguide display device is maximized. In other words, the image brightness is maximized under a certain system power consumption or the system power consumption is minimized at a certain image brightness.

$$\eta_N = \frac{1}{N_T - (N-1)} \quad (1)$$

wherein N is the output order of the regional modulation, $N_T$ is the total number of modulation regions, and $\eta_N$ is the coupling efficiency of the Nth region.

It is worth mentioning that the equation (1) is used for providing a uniform brightness of the image visible to the user, and to ensure the light flux output per unit area in the AR output diffraction grating region to be constant.

Due to the limitations of the structure or machine accuracy of the diffractive optical element, when the coupling output efficiency of the output diffractive optical element after optimization cannot be equal to the result given by the equation (1), a portion of the light energy is generated by the total internal reflection in the waveguide substrate within its effective coupling area. Assuming that the ratio of this portion of the light energy to the total light energy of total internal reflection is ητ, in order to provide the uniform brightness of the image within the range of the exit pupil, the coupling output efficiency of the output diffractive optical element is optimized to the equation (2).

$$\eta_N = \frac{\eta\tau}{N_T - (N-1)} \quad (2)$$

In order to optimize the coupling output efficiency, sensitive parameters having a significant influence with respect to the diffraction efficiency should be selected. The diffraction efficiency of the straight tooth surface relief grating 20 is arranged for being changed by modulating the duty cycle ff=w/Λ or the tooth height h. The slanted tooth surface relief grating 21 can modulate the duty cycle, the tooth height or the tilt angle α. The blazed grating 22 can modulate the tooth height or the face angle β.

Figure 7A:
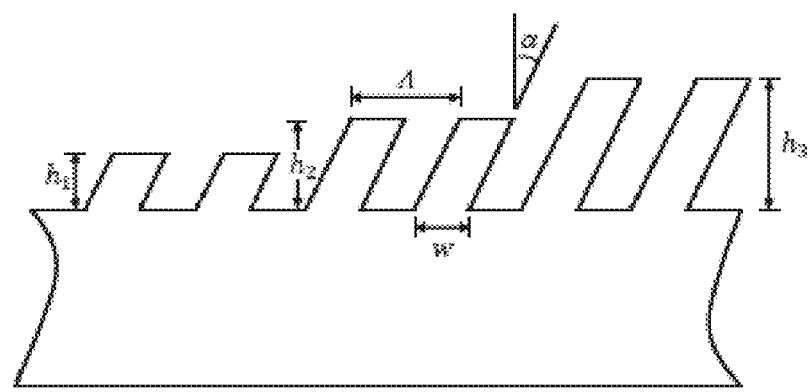
FIG. 7A illustrates the one dimensional straight tooth surface relief grating with depth modulation based on the bottom of the grating tooth according to the above preferred embodiment of the present invention.
Figure 7B:
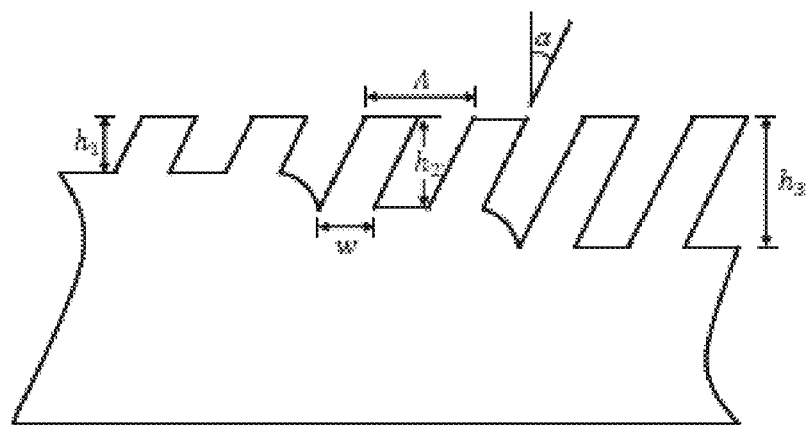
FIG. 7B illustrates the one dimensional straight tooth surface relief grating with depth modulation based on the top of the grating tooth according to the above preferred embodiment of the present invention.

Taking the tooth height of the embossed grating on the surface of the slanted tooth as an example, the tooth height is arranged to be changed according to the position of the grating on the waveguide surface. Depending on the manufacturing method, the specific structure can be modulated by the method based on the bottom of the grating tooth as shown in FIG. 7A or the method based on the top of the grating tooth as shown in FIG. 7A. The etching process of the present invention can be one of electron beam etching, reactive ion beam etching, magnetically enhanced reactive ion etching, high density plasma etching, inductively coupled plasma etching, pressure swing coupled plasma etching, and electrons cyclotron resonance etching. The modulation tooth height can be achieved by controlling the etching time and exposure intensity of the electron beam or ion beam on the master substrate. For mass production, the grating structure on the master substrate can be copied into the replica resin material by nano imprinting, casting, molding, injection molding, and the like. The master substrate can be made by electronic beam lithography and reactive ion beam etching.

Figure 8A:
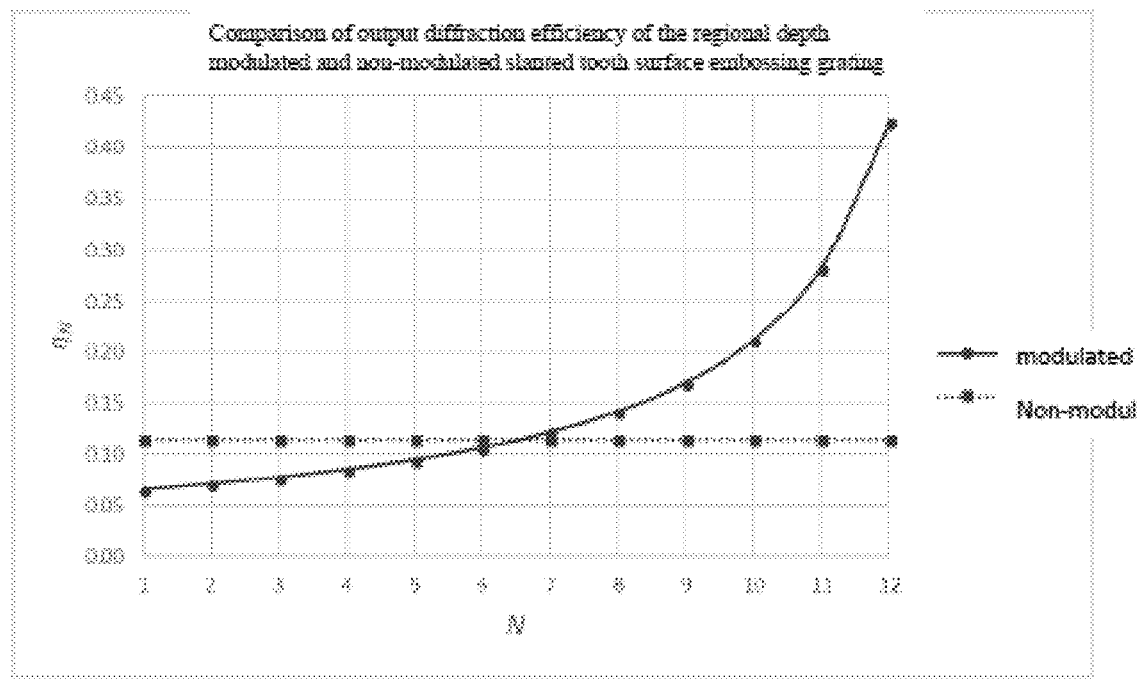
FIG. 8A is a table illustrating a comparison of an output diffraction efficiency of the regional depth modulated slanted tooth surface relief grating and the non-modulated slanted tooth surface relief grating.
Figure 8B:
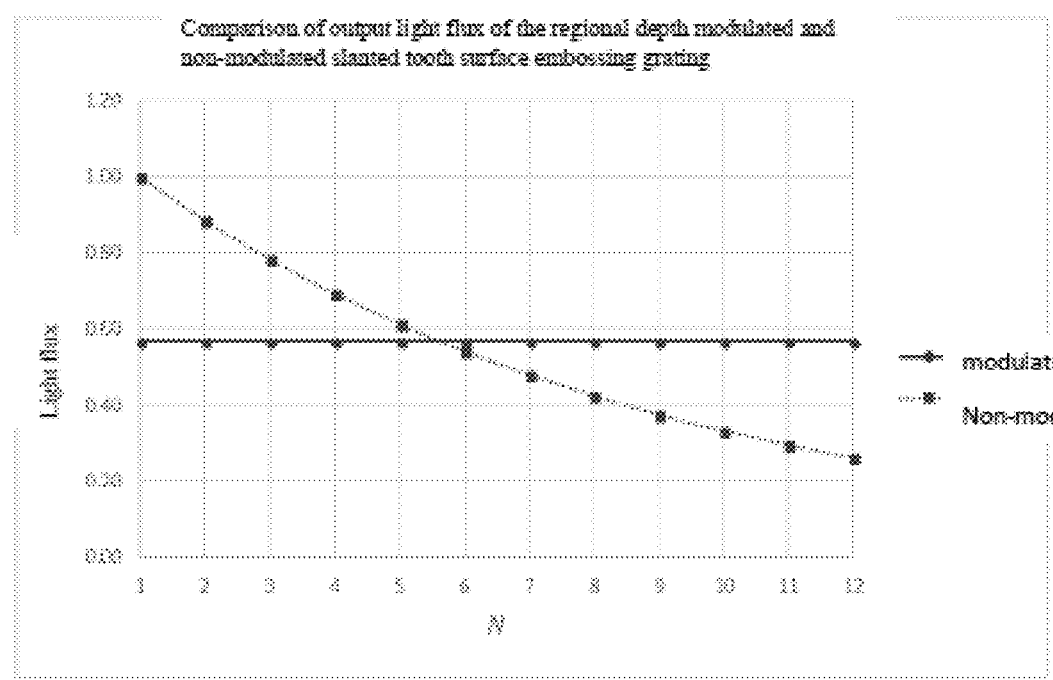
FIG. 8B is a table illustrating a comparison of an output light flux of the regional depth modulated slanted tooth surface relief grating and the non-modulated slanted tooth surface relief grating.

In one example, assume that a refractive index of n=1.7, the modulated slanted tooth surface relief grating has 12 depth modulated regions. FIG. 14 illustrates the relevant parameters of the system and the grating. FIG. 15 illustrates the tooth profile depth of the grating in each modulation region. As shown in FIG. 8A, the diffraction efficiency of the depth-modulated slanted tooth surface relief grating significantly increases as the grating depth increases. As shown in FIG. 8B, the output light flux of each area is constant, such that the user is able to see the image with an uniform brightness. By comparing the constant depth of tooth, the output total light flux of the modulated slanted tooth surface relief grating is the same as that of the non-modulated slanted tooth surface relief grating. As comparing the FIGS. 8A and 8B, the non-modulated slanted tooth surface relief grating has the constant output diffraction efficiency. Due to the distribution of the output energy of the light energy in the effective region of the waveguide, the output light flux will rapidly decrease according to the propagation distance within the range of the exit pupil. Therefore, the brightness of the output image is uneven within the range of the exit pupil to affect the user's visual experience.

The manufacturing method of the optical waveguide comprises the following steps.

(1) Form the master substrate by means of electron beam lithography.

(2) Etch the master substrate by using reactive ion beam process.

(3) Nano-imprint the master substrate for mass production and replication by the following steps.

(a) Place a chemical precursor of an elastic sub-mold in the master substrate, and after polymerization, remove the chemical precursor from the master substrate to form the elastic sub-mold, wherein the elastic sub-mold has a mold cavity formed with respect to the master substrate.

(b) Evenly apply a resin on a wafer substrate, wherein the resin can be UV solidifying resin or thermosetting resin.

(c) Mold the elastic sub-mold into the wafer substrate, preferably by applying pressure, in order to fully fill the resin into the mold cavity of the elastic sub-mold, and perform polymerization and solidification of the resin to form a polymer in an embossed area of the elastic sub-mold by ultraviolet light or heat.

(d) Remove the elastic sub-mold from the wafer substrate, such that the replicated structure is formed on the wafer substrate.

Figure 9A:
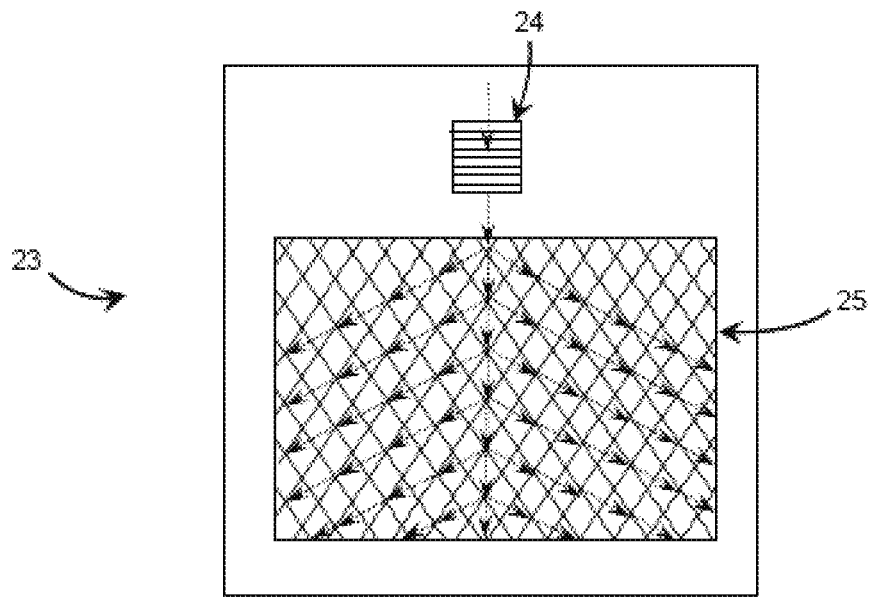
FIG. 9A is a front view of a two dimensional linear diffraction two dimensional exit pupil waveguide according to the above preferred embodiment of the present invention.
Figure 9B:
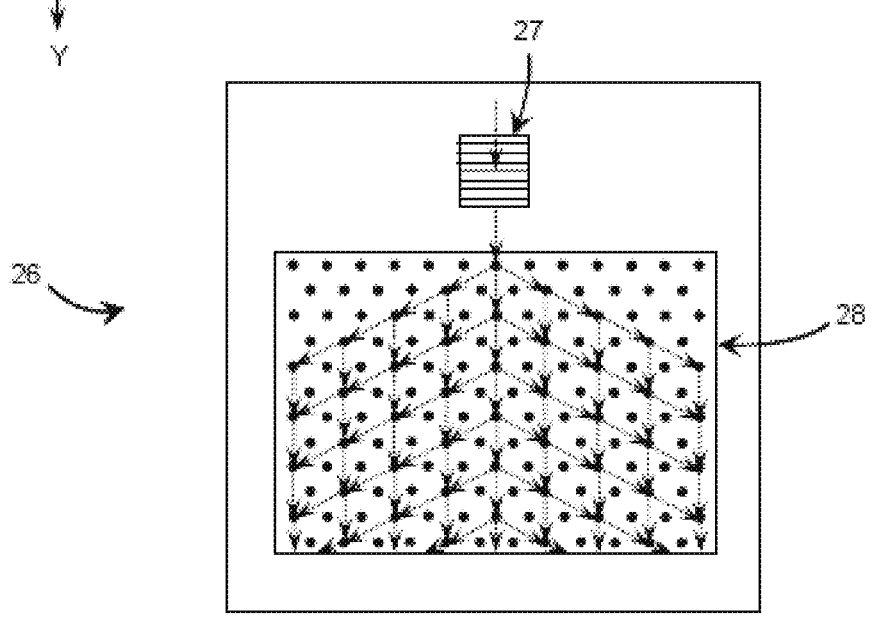
FIG. 9B is a front view of a two dimensional cylindrical diffraction two dimensional exit pupil waveguide according to the above preferred embodiment of the present invention.
Figure 10A:
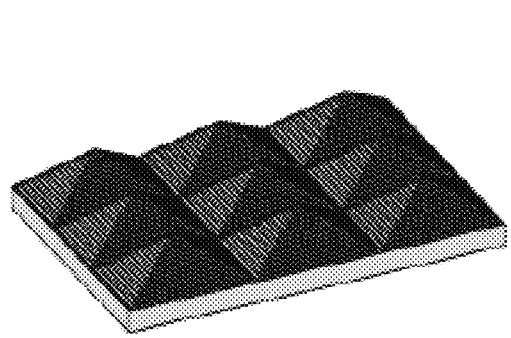
FIG. 10A is a schematic view of a two dimensional pyramid diffraction structure according to the above preferred embodiment of the present invention.
Figure 10B:
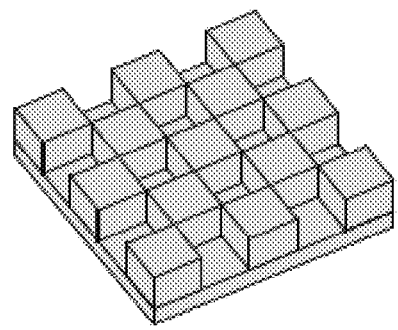
FIG. 10B is a schematic view of a two dimensional checkerboard diffraction structure according to the above preferred embodiment of the present invention.
Figure 10C:
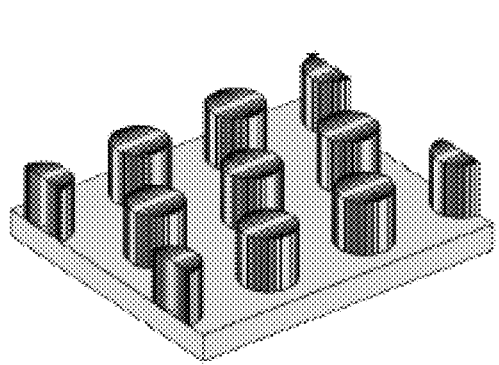
FIG. 10C is a schematic view of a two dimensional columnar diffraction structure according to the above preferred embodiment of the present invention.
Figure 10D:
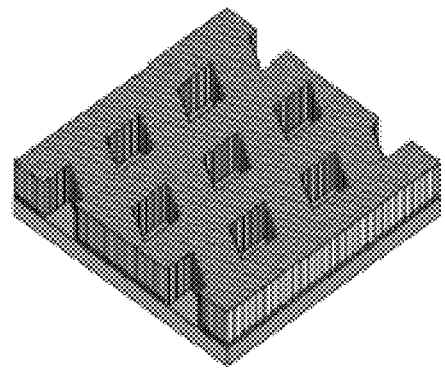
FIG. 10D is a schematic view of a two dimensional linear oblique diffraction structure according to the above preferred embodiment of the present invention.
Figure 10E:
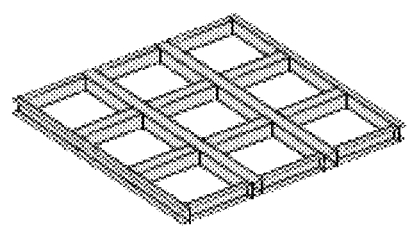
FIG. 10E is a schematic view of a two dimensional linear orthogonal diffraction structure according to the above preferred embodiment of the present invention.

The present invention can also be applied to the optical waveguide based on a two-dimensional periodic diffraction structure. In another example, the operating principle of the optical waveguide is arranged for the augmented reality device based on a two-dimensional linear diffraction waveguide and a two-dimensional columnar structure diffraction waveguide. FIGS. 9A and 9B illustrate the optical path of the two-dimensional linear diffraction waveguide 23 and the two-dimensional columnar structure diffraction waveguide 26 respectively. The input region 24 of the two-dimensional linear diffraction waveguide 23 and the input region 27 of the two-dimensional columnar diffraction waveguide 26 can be configured as the one-dimensional linear diffraction structure or a two-dimensional periodic diffraction structure. The output region 25 of the two-dimensional linear diffraction waveguide 23 and the output region 28 of the two-dimensional columnar structure diffraction waveguide 26 can be configured as the two-dimensional periodic diffraction structure. The periodicity of the two-dimensional periodic diffractive structure has at least two directions, wherein two or more directions of the periodicity can be perpendicular to each other or can be formed with any angle. It is different from the one-dimensional diffraction waveguide which requires the transmission diffractive optical element and the output diffractive optical element to complete the two-dimensional exit pupil expansion. Due to the multiple directions of the periodicity, the two-dimensional periodic diffractive structure allows the light being reflected by total internal reflection in the waveguide substrate within the output region 25 of the two-dimensional linear diffraction waveguide 23 or the output region 28 of the two-dimensional columnar diffraction waveguide 26 in order to complete the two-dimensional exit pupil expansion, so as to enlarge the viewing size of the screen.

FIGS. 10A to 10E illustrate five different two-dimensional periodic diffraction structures which are pyramid, checkerboard, columnar, linear oblique intersection, and linear orthogonal, but it should not be limited in the present invention. Similar to the above one-dimensional linear diffraction grating, if the dimensional parameters of the two-dimensional periodic diffraction structure remain unchanged, the structure is non-modulated and its diffraction efficiency remains constant. During the sequencing output of the two-dimensional expansion of the light in the two-dimensional diffraction output region, the output light flux at each sequencing output is decreased. Therefore, the brightness of the image to the user is not uniform within the range of the exit pupil of the waveguide. When the present invention is applied to the optical waveguide based on the two-dimensional periodic diffraction structure, the relevant structural parameters of the modulated two-dimensional periodic diffraction structure can be used, such that the coupling output diffraction efficiency is successively changed during the two-dimensional expansion process so as to achieve the brightness uniformity of the output image. Alternatively, the structural parameters can be modulated to change the diffraction efficiency.

Figure 11A:
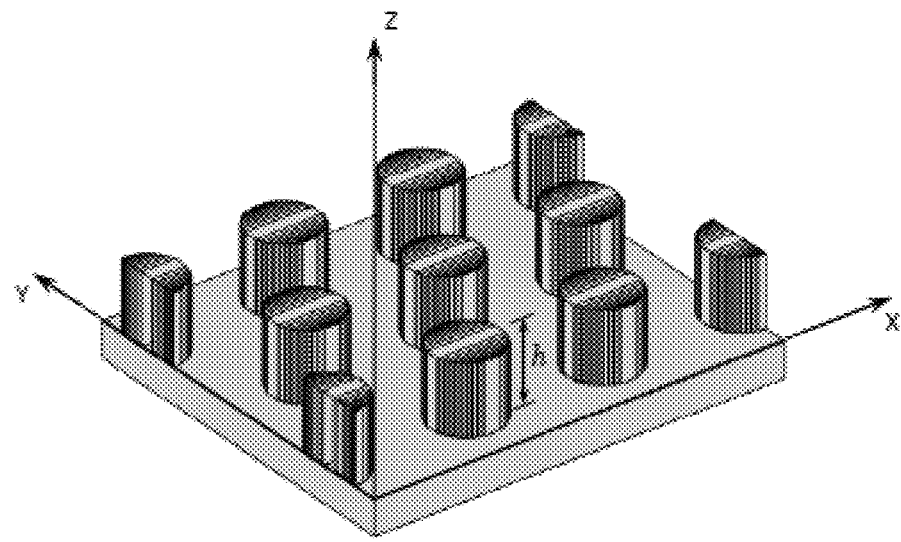
FIG. 11A is a perspective view illustrating a two dimensional columnar diffraction structure and a related Cartesian coordinate system, wherein the X-axis of the coordinate system is parallel to a certain periodic direction.
Figure 11B:
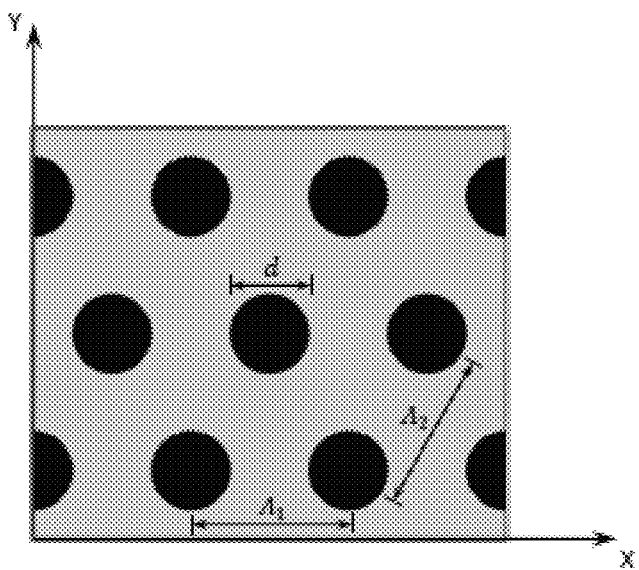
FIG. 11B is a top view illustrating a two dimensional columnar diffraction structure and its related structural parameters according to the above preferred embodiment of the present invention.
Figure 12:
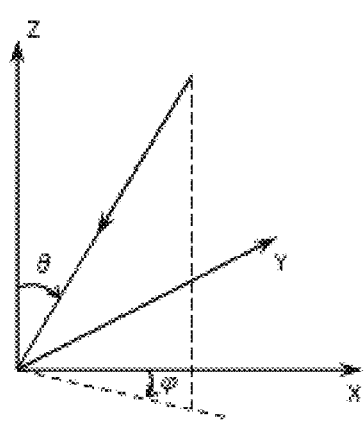
FIG. 12 is a polar coordinate system defining a light incident direction according to the above preferred embodiment of the present invention.
Figure 13A:
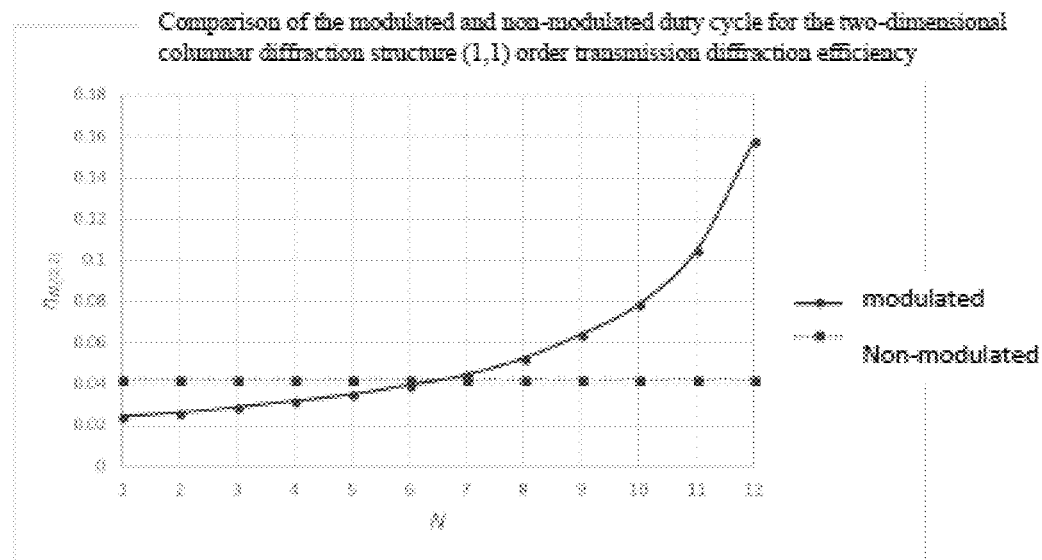
FIG. 13A is a table illustrating a comparison of the modulated duty cycle and non-modulated duty cycle for the two-dimensional columnar diffraction structure (1,1) order transmission diffraction efficiency.
Figure 13B:
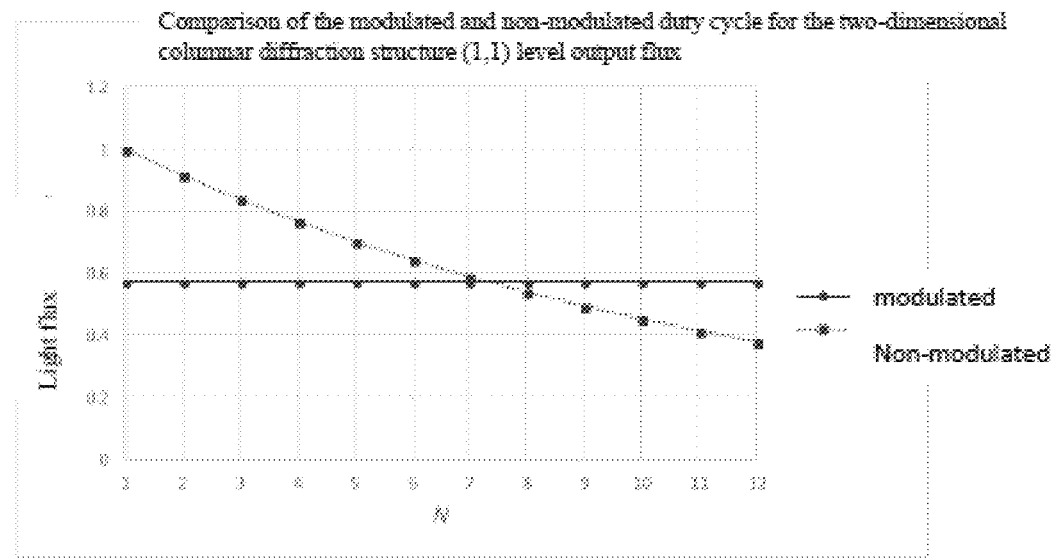
FIG. 13B is a table illustrating a comparison of the modulated duty cycle and non-modulated duty cycle for the two-dimensional columnar diffraction structure (1,1) level output flux.

FIGS. 11A and 11B illustrate the two-dimensional columnar diffraction structure and its related parameters as an example. The X-axis of the coordinate system is parallel to the direction of the first period, and the Z-axis is perpendicular to the waveguide surface. The relevant structural parameters are height h, column diameter d, first period $\Lambda 1$ and second period $\Lambda 2$. FIG. 12 illustrates the light incident direction defined by a polar angle $\Theta$ and an azimuth furnace in the coordinate system. Due to the periodicity in both two directions, the diffraction order of the two-dimensional structure is expressed in the form of (m, n). The diffraction efficiency of the two-dimensional columnar diffractive structure can be changed by modulating the duty cycle $ffi=d/\Lambda^{\hat{}}ff2=d/\Lambda 2$ or the tooth height h. In one example of the modulation duty cycle, the columnar diffraction structure has a refractive index $\eta=1.7$ and has 12 duty cycle modulated regions. FIG. 16 shows the relevant parameters of the system, the diffraction structure, and the angle of incidence. FIG. 17 shows the duty cycle of the columnar structure in each modulation region. Such design outputs a diffraction order of (1,1). FIG. 13A shows the comparison of the modulated duty cycle and non-modulated duty cycle, wherein the diffraction efficiency of the modulated duty cycle of the two-dimensional columnar diffraction structure significantly increases as the duty cycle thereof increases so as to show the sensitivity of the diffraction efficiency of the diffraction structure to the duty cycle. As shown in FIG. 13A, under the condition of the same total light flux, the output light flux of the non-modulated two-dimensional columnar diffraction structure with constant duty cycle will gradually decrease during the propagation and distribution of the waveguide, such that the brightness of the output image is uneven within the range of the exit pupil so as to affect the user's visual experience. Accordingly, the two-dimensional columnar diffraction structure of the duty cycle modulation has a constant output light flux in each modulation region, such that the brightness image is uniform for the user to view so as to significantly improve the user's visual experience.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An augmented reality device for being worn by a user, comprising: a spectacle frame which comprises two spectacle arms and a bridge; and an augmented reality system which comprises:

an optical projector provided at each of said spectacle arms for projecting a light beam; and
  a waveguide display device which comprises:
  two optical waveguides spacedly coupled at said spectacle frame for aligning with eyes of the user respectively; wherein each of said optical waveguides comprises:
  an input diffractive optical element aligned with said optical projector for diffracting the light beam;
  a waveguide substrate arranged for reflecting the light beam diffracted by said input diffractive optical element by means of total internal reflection; and an output diffractive optical element which comprises a diffraction grating structure coupled at said waveguide substrate for partially diffracting the light beam as a diffracted light and partially transmitting the light beam as a transmitted light during a total internal reflection of the light beam within said waveguide substrate, wherein a diffraction efficiency of said diffraction grating structure is modulated based on parameters related to tooth profile thereof that at least one of said parameters is modulated to change with respect to positions on said diffraction grating structure so as to obtain varied diffraction efficiency of said output diffractive optical element at various positions, thereby the diffracted light is diffracted by said output diffractive optical element and is projected out of said waveguide substrate toward the user eye, wherein the transmitted light is continuously transmitted and reflected within said waveguide substrate by the total internal reflection until the transmitted light is totally diffracted out of said waveguide substrate, so as to complete an exit pupil expansion.

2. The augmented reality device, as recited in claim 1, wherein said waveguide substrate has a diffractive side and an opposed projecting side, wherein said input diffractive optical element and said output diffractive optical element are located at said diffractive side of said waveguide substrate for guiding the diffracted lights being projected out said waveguide substrate through said projecting side thereof.

3. The augmented reality device, as recited in claim 1, wherein said output diffractive optical element has an effective area arranged to maintain a constant light flux output per unit area therein for providing an uniform brightness image when the diffracted lights being projected out said waveguide substrate.

4. The augmented reality device, as recited in claim 1, wherein said exit pupil expansion has a sequencing energy output generated by said output diffractive optical element, wherein an output diffraction efficiency of said output diffractive optical element is optimized to:

$$\eta_N = \frac{1}{N_T - (N-1)}$$

wherein N is an output order of a regional modulation, $N_T$ is a total number of modulation regions, and $\eta_N$ is a coupling efficiency of the Nth modulation region.

5. The augmented reality device, as recited in claim 4, wherein said diffraction grating structure of said output diffractive optical element is a one-dimensional diffraction grating structure which is a tooth grating structure, wherein said parameters include one or more of a parameter of tooth height, a parameter of face angle, a parameter of tilt angle, and a parameter of duty cycle of said tooth grating structure which are modulated to provide varied parameter values with respect to varied positions on said diffraction grating structure.

6. The augmented reality device, as recited in claim 4, wherein said diffraction grating structure of said output diffractive optical element is a two-dimensional diffraction grating structure to complete two-dimensional exit pupil expansion of the light beam, wherein said parameters include one or more of a parameter of duty cycle and a parameter of tooth height which are modulated to provide varied parameter values with respect to varied positions on said diffraction grating structure.

7. The augmented reality device, as recited in claim 1, wherein each of said optical waveguides further comprises a transmission diffractive optical element that deflects a direction of the light beam from said input diffractive optical element to said output diffractive optical element.

8. The augmented reality device, as recited in claim 1, wherein said optical projector is built-in with at least one of said spectacle arms of said spectacle frame, wherein said optical projector comprises a micro-display for projecting the light beam and a lens set that amplifies the light beam before entering to said input diffractive optical element.

9. The augmented reality device, as recited in claim 1, wherein said augmented reality system further comprises an external space collector built-in at said bridge of said spectacle frame between said optical waveguides, wherein said external space collector is selected by a group consisting of a RGB camera, a single color camera, and a depth camera.

10. The augmented reality device, as recited in claim 1, wherein said augmented reality system further comprises a computing module and a positioning sensor built-in with at least one of said spectacle arms of said spectacle frame.

11. The augmented reality device, as recited in claim 1, wherein the transmitted light is totally diffracted out of said waveguide substrate to complete said exit pupil expansion along at least one of a X-direction and a Y-direction.

12. The augmented reality device, as recited in claim 1, wherein the transmitted light is totally diffracted out of said waveguide substrate to complete said exit pupil expansion along a X-direction and a Y-direction.

13. The augmented reality device, as recited in claim 1, wherein said at least one of said parameters is selected from the group consisting of tooth height, duty cycle, tilt angle, and face angle.

14. The augmented reality device, as recited in claim 1, wherein said diffraction grating structure of said output diffractive optical element is a one-dimensional diffraction grating structure which is a tooth grating structure, wherein said parameters include one or more of a parameter of tooth height, a parameter of face angle, a parameter of tilt angle, and a parameter of duty cycle of said tooth grating structure which are modulated to provide varied parameter values with respect to varied positions on said diffraction grating structure.

15. The augmented reality device, as recited in claim 1, wherein said diffraction grating structure of said output diffractive optical element is a two-dimensional diffraction grating structure to complete two-dimensional exit pupil expansion of the light beam, wherein said parameters include one or more of a parameter of duty cycle and a parameter of tooth height which are modulated to provide varied parameter values with respect to varied positions on said diffraction grating structure.

* * * * *